US 8,164,312 B1
Apr. 24, 2012

(12) United States Patent
Eitzmann

(54) REDUCTION IN GENERATOR-SOURCED FAULT CURRENT CONTRIBUTION

(75) Inventor: Murray Alan Eitzmann, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/015,014

(22) Filed: Jan. 27, 2011

(51) Int. Cl.
*H02P 9/10* (2006.01)

(52) U.S. Cl. .................................... 322/37; 322/24

(58) Field of Classification Search ............. 322/20, 322/22, 23, 24, 25, 37, 59, 99; 361/42, 23
See application file for complete search history.

(56) References Cited

U.S. PATENT DOCUMENTS

| | | | | |
|---|---|---|---|---|
| 4,155,107 A | * | 5/1979 | Osborne et al. | 361/20 |
| 4,379,990 A | * | 4/1983 | Sievers et al. | 322/99 |
| 4,438,386 A | * | 3/1984 | Gyugyi | 323/210 |
| 4,710,840 A | * | 12/1987 | Shepler et al. | 361/20 |
| 5,583,420 A | * | 12/1996 | Rice et al. | 322/25 |
| 5,621,305 A | * | 4/1997 | Clark et al. | 323/210 |
| 5,764,462 A | * | 6/1998 | Tanaka et al. | 361/42 |
| 6,191,562 B1 | * | 2/2001 | Mueller et al. | 322/59 |
| 7,345,456 B2 | * | 3/2008 | Gibbs et al. | 322/19 |
| 7,554,301 B2 | | 6/2009 | Trainer et al. | |
| 2009/0067101 A1 | | 3/2009 | Nelson | |
| 2009/0292488 A1 | | 11/2009 | Ingham et al. | |

FOREIGN PATENT DOCUMENTS

WO 2009032070 A2 3/2009

* cited by examiner

*Primary Examiner* — Nicholas Ponomarenko
(74) *Attorney, Agent, or Firm* — Hoffman Warnick LLC; Ernest G. Cusick

(57) ABSTRACT

An approach for reduction in generator-sourced fault current contribution is disclosed. In one aspect, automatic excitation control of a generator is coordinated with a generator step-up transformer operating on maximized tap selection to reduce generator fault current contribution to an electrical power distribution network.

20 Claims, 1 Drawing Sheet

REDUCTION IN GENERATOR-SOURCED FAULT CURRENT CONTRIBUTION

BACKGROUND OF THE INVENTION

The present invention relates generally to electrical power distribution networks and more particularly to reducing generator-sourced fault current contribution in an electrical power distribution network.

An electrical power distribution network typically includes transmission lines and other connection components that connect a number of electric power producers such as generators to electrical loads. When a fault occurs on one of the transmission lines, the generators that are connected at the time of the fault create a short current fault contribution. Typically, in the event of a fault, each generator will tend to increase its output current in an attempt to maintain the output voltage at a rated value. This results in increased current flowing over the electrical power distribution network, which is referred to as fault current. Switchgear provided at various locations of the electrical power distribution network is typically used to interrupt the fault current. In order for the switchgear to function properly the fault current should not be above the rated capacity of the switchgear, which is referred to as fault level. As more generators are added to the electrical power distribution network to serve electrical loads, fault levels required on the network increase by increasing fault currents. When the required fault level exceeds the rated levels of the switchgear, the switchgear can be upgraded or replaced to allow a higher fault level. This may be an expensive option for established electrical power distribution networks and may be an impediment when it comes time for power producers to decide whether to add additional generators.

BRIEF DESCRIPTION OF THE INVENTION

In one aspect of the present invention, a system is provided. The system comprises a generator including field winding that is configured to generate a magnetic field in response to receiving a field excitation current and a generator terminal that is configured to generate an output voltage that is a function of the field excitation current applied to the field winding. A generator step-up transformer, coupled to the generator terminal of the generator, is configured to adjust the output voltage generated from the generator terminal for interconnection with an electrical power distribution network. The generator step-up transformer operates on a maximum tap selection. The system further comprises an excitation system that is configured to supply field excitation current to the field winding of the generator. An excitation system compensator is configured to regulate the field excitation current supplied by the excitation system to the generator. The regulated field excitation current effectuates a change in the output voltage at the generator terminal that is a function of reactive power generated from the generator to reduce generator-sourced fault current contribution to the electrical power distribution network.

In a second aspect of the present invention, a system for reducing fault current contribution from a power plant to a point of interconnection with an electrical power distribution network is disclosed. In this aspect of the present invention, the system comprises a generator including field winding that is configured to generate a magnetic field in response to receiving a field excitation current and a generator terminal that is configured to generate an output voltage that is a function of the field excitation current applied to the field winding. A generator step-up transformer, coupled to the generator terminal of the generator, is configured to adjust the output voltage generated from the generator terminal for interconnection with an electrical power distribution network. The generator step-up transformer operates on a maximum tap selection. An excitation system is configured to supply the field excitation current to the field winding of the generator. An excitation system compensator is configured to determine a compensation voltage for use by the excitation system to regulate the supply of the field excitation current to the generator that effectuates voltage control of the generator to reduce generator-sourced fault current contribution to the electrical power distribution network during a normal operating mode of the generator before occurrence of a fault.

DETAILED DESCRIPTION OF THE INVENTION

Figure 1:
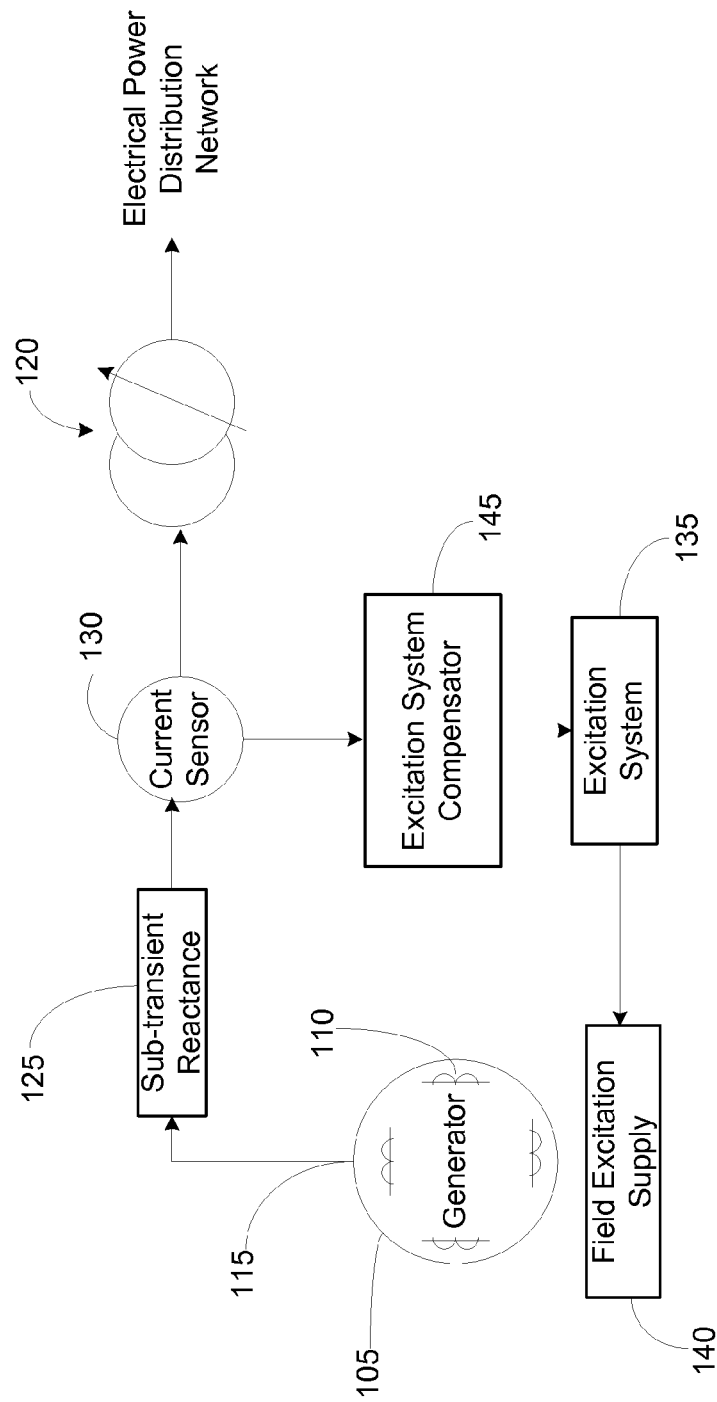
FIG. 1 is a schematic diagram illustrating a system for reducing generator-sourced fault current contribution from a power plant to a point of interconnection with an electrical power distribution network according to embodiments of the present invention.

Various embodiments of the present invention are directed to reducing generator-sourced fault current contribution to a point of interconnection with an electrical power distribution network. In one embodiment, a high impedance generator that receives an excitation supply from an excitation system generates an output voltage that is supplied to the electrical power distribution network via a high impedance transformer. An excitation system compensator is used to regulate the supply of field excitation current to the generator that causes voltage control of the generator in a manner that reduces generator-sourced fault current contribution to the electrical power distribution network before occurrence of a fault. Even if a fault were to occur, embodiments of the present invention would enable the generator to produce a fault at a lower fault current than it otherwise would.

Technical effects of the various embodiments of the present invention include enabling a fault-constrained grid (i.e., electrical power distribution network) to accommodate additional power plants without requiring major expenditures on higher voltage transmission lines due to the safety limitation of switchgear fault current ratings. Another technical effect associated with the various embodiments of the present invention include enabling power plants to provide volt-ampere-reactive (VAR) support over a wide range of grid code mandated system conditions of voltage level and system strength. Other technical effects with the various embodiments of the present invention include providing enhanced critical clearing times of faults generated from under-excited operation of a generator, which helps with grid code compliance of fault ride-through criteria.

Referring to the drawings, FIG. 1 is a schematic diagram illustrating a system 100 for reducing generator-sourced fault current contribution from a power plant to a point of interconnection with an electrical power distribution network according to one embodiment of the present invention. As shown in FIG. 1, system 100 includes a generator 105 having field winding 110 that is configured to generate a magnetic field in response to receiving a field excitation current and a generator terminal 115 that is configured to generate an output voltage that is a function of the field excitation current applied to field winding 110. For ease of illustration of the various embodiments of the present invention, other components that are associated with a generator are not shown in FIG. 1. Those skilled in the art will recognize that generator 105 would have a rotor wrapped with field winding 110 and a rotor shaft mounted within a stator wrapped in armature winding. In operation, the rotor shaft would be driven by a turbine such as a steam turbine or gas turbine, so that field winding 110 of the rotor produces a constant magnetic field in response to receiving a supply of field excitation current. The magnetic field interacts with the armature winding of the stator to generate an output voltage at generator terminal 115.

Those skilled in the art will also recognize that not all auxiliary systems associated with generator 105 are illustrated in FIG. 1. For example, those skilled in the art will appreciate that generator 105 can have auxiliary systems that typically include a supply of water or other coolants provided to the generator coolers (heat exchangers), a stator winding cooling system, a hydrogen supply and control system for generators using hydrogen as the primary coolant, and bearing lubrication systems.

Also, for ease of illustration of the various embodiments of the present invention, other parts of the power plant that would work in conjunction with generator 105 are not shown in FIG. 1. Those skilled in the art will appreciate that the power plant could include, for example, the use of steam turbines, gas turbines, heat recovery steam generators.

Referring back to FIG. 1, system 100 further includes a generator step-up transformer 120 coupled to generator terminal 115 of generator 105 via a current sensor 130 (e.g., current transformer, Hall Effect sensor, shunt, Rogowski coil, fiber optic current sensor, etc.). Generator step-up transformer 120 is configured to adjust the output voltage generated from generator terminal 115 for interconnection with the electrical power distribution network. In particular, generator step-up transformer 120 raises the voltage provided from generator terminal 115 to a level that is compatible with the electrical power distribution network. In operation, generator step-up transformer 120 operates on a maximum tap selection over a wide range of operating conditions to provide a high impedance. As used herein, a high impedance generator step-up transformer is a transformer that has increased self reactance not mutually coupled between the windings that can have a range of about 15% to about 35% impedance on the generator volt-ampere base. Generator step-up transformer 120 can utilize a no-load tap changer or an on-load tap changer to obtain a maximum tap selection over a wide range of operation conditions. As used herein, a maximum tap selection over a wide range of operation conditions comprises a range of about 1.05 to about 1.20 per unit on the high voltage side of the transformer.

The use of the maximum tap selection of generator step-up transformer 120 results in an increased turns ratio of the transformer. An increased turns ratio enables generator step-up transformer 120 to reduce the fault current contribution on the high voltage side of the transformer. In one embodiment, the turns ratio of generator step-up transformer 120 is defined as:

$$Vt: Vgrid*ntap, \quad (1)$$

wherein Vt is the voltage at the output terminal of generator 105, Vgrid is the nominal voltage supplied to the electrical power distribution network and ntap is an off-nominal tap range defining an open circuit voltage of the electrical power distribution network. The use of the maximum tap and turns ratio to facilitate a reduction in generator-sourced fault current contribution is discussed below in more detail.

FIG. 1 shows that system 100 further includes an excitation system 135 that is configured to generate an excitation supply used for generating direct current (DC) power to generator 105. In particular, a field excitation supply 140 uses the excitation supply generated by excitation system 135 to inject direct current into field winding 110 of generator 105. As mentioned above, injection of the direct current or field excitation current to the field winding of the generator facilitates the generator's ability to generate an output voltage at generator terminal 115. Excitation system 135 may be any commercially available exciter that can provide an excitation supply used for generating DC power. In one embodiment, excitation system 135 may be an EX2100 excitation system provided by the General Electric Company. In one embodiment, field excitation supply 140 may be a silicon-controlled rectifier (SCR) bridge. Those skilled in the art will recognize that other devices such as rotating or brushless AC to DC rectifiers, batteries, or other static power frequency conversion equipment can be used to inject direct current in generator 105.

System 100 further includes an excitation system compensator 140 that is coupled to current sensor 130 and excitation system 135. Excitation system compensator 140 is configured to regulate the field excitation current supplied by excitation system 135 to generator 105 via field excitation supply 140. In one embodiment, the regulated field excitation current effectuates a change in the output voltage at generator terminal 115 as a function of the reactive power generated from generator 105. As explained below, this assists in reducing generator-sourced fault current contribution to the electrical power distribution network. Although, FIG. 1 shows that excitation system compensator 140 is a separate component apart from excitation system 135, those skilled in the art will recognize that it can reside as a functionality within excitation system 135 or as part of a controller used to control operation of generator 105 and excitation system 135. A MARK VIe controller provided by the General Electric Company is one example of a controller that can be used to control operation of generator 105 and excitation system 135, and that could be used to implement the control strategy associated with the compensatory functionalities provided by excitation system compensator 140.

Regardless of its location within system 100, excitation system compensator 140 can be implemented in the form of an entirely hardware embodiment, an entirely software embodiment or an embodiment containing both hardware and software elements. In one embodiment, the processing functions performed by excitation system compensator 140 may be implemented in software, which includes but is not limited to firmware, resident software, microcode, etc.

Furthermore, the processing functions performed by excitation system compensator 140 can take the form of a computer program product accessible from a computer-usable or computer-readable medium providing program code for use by or in connection with a computer or any instruction execution system (e.g., processing units). For the purposes of this description, a computer-usable or computer readable medium can be any computer readable medium that can contain or store the program for use by or in connection with the computer or instruction execution system.

The computer readable medium can be an electronic, magnetic, optical, electromagnetic, infrared, or semiconductor system, apparatus or device). Examples of a computer-readable medium include a semiconductor or solid state memory, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

In operation, excitation system compensator 145 is configured to determine a compensation voltage for use by excitation system 135 to regulate the supply of the field excitation current to generator 105. This effectuates voltage control of generator 105 to reduce generator-sourced fault current contribution to the electrical power distribution network. In particular, the compensation voltage is derived as a function of the output voltage at generator terminal 115, current produced by the generator that is measured by current sensor 130, and a predetermined impedance compensation that is proportional to the sub-transient reactance 125 of generator 105. As is well-known, sub-transient reactance is the inherent impedance associated with generator 105.

Although FIG. 1 shows a processing block for sub-transient reactance 125, those skilled in the art will recognize that this parameter has already been determined and that its depiction in the FIGURE is to illustrate that there is inherent impedance associated with generator 105 that is subsequently utilized by excitation system compensator 145. As is known in the art, the sub-transient reactance of a generator can be used to calculate the flow of short circuit current. When a short circuit fault occurs in an electrical power distribution network the fault current is a function of the internal voltage of the connected machines (e.g., generators), the impedance of the machine and the impedance to the point of the fault. Consequently, the internal voltage of the generator and generator impedance determines the current that flows when the terminals of the generator are shorted.

The above-noted compensation voltage determined by excitation system compensator 145 is derived in accordance with the following equation:

$$Vc = Vt + Z*Ig, \quad (2)$$

wherein Vc is the compensation voltage, Vt is the voltage at generator terminal 115, Z is the predetermined impedance compensation associated with generator 105 and Ig is the current produced by generator 105 as measured by current sensor 130.

In one embodiment, excitation system 135 uses the compensation voltage Vc to adjust the excitation supply provided to generator 105 via field excitation supply 140 in order to effectuate a change in the output voltage at generator terminal 115. In particular, the change in the output voltage effectuated by the combination of the tap selection of generator step-up transformer 120 and the use of excitation system compensator 145 will be a function of the reactive power generated from generator 105. In one embodiment, the output voltage at generator terminal 115 will decrease as the reactive power generated from generator 105 increases. This kind of compensation is commonly used to allow parallel generators at the same bus to share VAR loading while maintaining stable voltage control of individual generators to respond automatically to power system demands. For purposes of the various embodiments of the present invention, this compensation allows a single generator to have stable voltage control and minimize internal voltage of the generator to reduce the generator-sourced fault current contribution and open-circuit voltage. Essentially, this allows generator step-up transformer 120 operate on the maximum tap over a wide range of operating conditions, while providing grid friendly voltage control and reactive power support. Furthermore, by determining the compensation in proportion to the sub-transient reactance of generator 105, system 100 can regulate the voltage at a location that is part-way internal to generator 105.

The combination of the compensation provided by excitation system compensator 145 and utilizing a high impedance generator step-up transformer 120 operating with a maximum tap selection enables system 100 to effectively increase the impedance of the power plant as viewed from the point of interconnection with the electrical power distribution network. As a result, in one embodiment, the compensation can reduce an internal voltage of the generator in response to a lagging power factor condition. In this embodiment, the reduced internal voltage compensates for the maximum tap selection of the generator step-up transformer to reduce generator-sourced fault current contribution to the electrical power distribution network. In another embodiment, the compensation can boost an internal voltage of the generator in response to a leading power factor condition. In this embodiment, the boosted internal voltage compensates for the maximum tap selection of the generator step-up transformer. Boosting internal voltage at a leading power factor condition facilitates an increased critical clearing time of faults generated from an under-excited operation of a generator, which helps with grid code compliance of fault ride-through criteria. In either embodiment, the combination of the compensation provided by excitation system compensator 145 and the maximum tap selection of generator step-up transformer 120 facilitate reduced generator-sourced fault current contribution at the point of interconnection with the electrical power distribution network, which would be on the high voltage side of the generator step-up transformer that connects with the network. In addition, the configuration of excitation system compensator 145 and the maximum tap selection of generator step-up transformer 120 enables system 100 to automatically reduce generator-sourced fault current contribution to the electrical power distribution network before occurrence of a fault. If a fault were to occur, the combination of the compensation provided by excitation system compensator 145 and the maximum tap selection of generator step-up transformer 120 would cause system 100 to generate a fault at a lower fault current.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A system, comprising:
   a generator including field winding that is configured to generate a magnetic field in response to receiving a field excitation current and a generator terminal that is configured to generate an output voltage that is a function of the field excitation current applied to the field winding;
   a generator step-up transformer coupled to the generator terminal of the generator, that is configured to adjust the output voltage generated from the generator terminal for interconnection with an electrical power distribution network, wherein the generator step-up transformer operates on a maximum tap selection;
   an excitation system that is configured to supply the field excitation current to the field winding of the generator; and
   an excitation system compensator that is configured to regulate the field excitation current supplied by the excitation system to the generator, wherein the regulated field excitation current effectuates a change in the output voltage at the generator terminal as a function of reactive power generated from the generator to reduce generator-sourced fault current contribution to the electrical power distribution network.

2. The system according to claim 1, wherein the regulated field excitation current supplied by the excitation system to the generator effectuates a decrease in the output voltage at the generator terminal as the reactive power generated from the generator increases.

3. The system according to claim 1, wherein the excitation system compensator is configured to determine a compensation voltage for use by the excitation system to regulate the supply of the field excitation current to the generator that effectuates voltage control of the generator to reduce generator-sourced fault current contribution to the electrical power distribution network.

4. The system according to claim 3, wherein the compensation voltage is derived as a function of the output voltage at the generator terminal, current produced by the generator and a predetermined impedance compensation that is proportional to sub-transient reactance of the generator.

5. The system according to claim 4, wherein the compensation voltage is derived in accordance with the following equation:

$$Vc=Vt+Z*Ig,$$

wherein Vc is the compensation voltage, Vt is the voltage at the generator terminal, Z is the predetermined impedance compensation and Ig is the current produced by the generator.

6. The system according to claim 3, wherein the voltage control of the generator effectuated by the compensation voltage comprises reducing an internal voltage of the generator in response to a lagging power factor condition.

7. The system according to claim 6, wherein the reduced internal voltage compensates for the maximum tap selection of the generator step-up transformer to reduce generator-sourced fault current contribution to the electrical power distribution network.

8. The system according to claim 3, wherein the voltage control of the generator effectuated by the compensation voltage comprises boosting an internal voltage of the generator in response to a leading power factor condition.

9. The system according to claim 8, wherein the boosting of the internal voltage of the generator at a leading power factor condition facilitates an increased critical clearing time of faults generated from an under-excited operation of the generator.

10. The system according to claim 8, wherein the boosted internal voltage compensates for the maximum tap selection of the generator step-up transformer to reduce generator-sourced fault current contribution to the electrical power distribution network.

11. The system according to claim 1, wherein the maximum tap selection of the generator step-up transformer is determined as a function of a turns ratio set for the generator step-up transformer.

12. The system according to claim 11, wherein the turns ratio of the generator step-up transformer is defined as:

$$Vt: Vgrid*ntap, \text{wherein}$$

Vt is the voltage at the output terminal of the generator, Vgrid is the voltage supplied to the electrical power distribution network and ntap is an off-nominal tap range defining an open circuit voltage of the electrical power distribution network.

13. The system according to claim 1, wherein the reduced generator-sourced contribution of fault current occurs on a high voltage side of the generator step-up transformer that interconnects with the electrical power distribution network.

14. The system according to claim 1, wherein the reduced generator-sourced fault current contribution to the electrical power distribution network is accomplished during a normal operating mode of the generator before occurrence of a fault.

15. A system for reducing fault current contribution from a power plant to a point of interconnection with an electrical power distribution network, comprising:
a generator including field winding that is configured to generate a magnetic field in response to receiving a field excitation current and a generator terminal that is configured to generate an output voltage that is a function of the field excitation current applied to the field winding;
a generator step-up transformer, coupled to the generator terminal of the generator, that is configured to adjust the output voltage generated from the generator terminal for interconnection with an electrical power distribution network, wherein the generator step-up transformer operates on a maximum tap selection;
an excitation system that is configured to supply the field excitation current to the field winding of the generator; and
an excitation system compensator that is configured to determine a compensation voltage for use by the excitation system to regulate the supply of the field excitation current to the generator that effectuates voltage control of the generator to reduce generator-sourced fault current contribution to the electrical power distribution network during a normal operating mode of the generator before occurrence of a fault.

16. The system according to claim 15, wherein the voltage control of the generator effectuated by the compensation voltage comprises decreasing the output voltage at the generator terminal as reactive power generated from the generator increases.

17. The system according to claim 15, wherein the compensation voltage is derived as a function of the output voltage at the generator terminal, current produced by the generator and a predetermined impedance compensation that is proportional to sub-transient reactance of the generator.

18. The system according to claim 15, wherein the voltage control of the generator effectuated by the compensation voltage comprises reducing an internal voltage of the generator in response to a lagging power factor condition and boosting an internal voltage of the generator in response to a leading power factor condition to compensate for the maximum tap selection of the generator step-up transformer.

19. The system according to claim 15, wherein the maximum tap selection of the generator step-up transformer is determined as a function of a turns ratio set for the generator step-up transformer.

20. The system according to claim 19, wherein the turns ratio of the generator step-up transformer is defined as:

$$Vt: Vgrid*ntap, \text{wherein}$$

Vt is the voltage at the output terminal of the generator, Vgrid is the voltage supplied to the electrical power distribution network and ntap is an off-nominal tap range defining an open circuit voltage of the electrical power distribution network.

* * * * *